United States Patent
Roderick et al.

(10) Patent No.: US 7,089,292 B1
(45) Date of Patent: Aug. 8, 2006

(54) INTERFACE INCLUDING NON-VISUAL DISPLAY FOR USE IN BROWSING AN INDEXED COLLECTION OF ELECTRONIC CONTENT

(75) Inventors: Jayne B. Roderick, San Francisco, CA (US); William L. Verplank, Menlo Park, CA (US); Scott S. Snibbe, San Francisco, CA (US)

(73) Assignee: Vulcan Patents, LLC, Seattle, WA (US)

( * ) Notice: Subject to any disclaimer, the term of this patent is extended or adjusted under 35 U.S.C. 154(b) by 567 days.

(21) Appl. No.: 09/918,681

(22) Filed: Jul. 27, 2001

Related U.S. Application Data

(63) Continuation-in-part of application No. 09/740,580, filed on Dec. 18, 2000, now abandoned.

(60) Provisional application No. 60/172,867, filed on Dec. 20, 1999.

(51) Int. Cl.
*G06F 15/16* (2006.01)

(52) U.S. Cl. ............. 709/217; 709/219; 345/156; 345/169; 345/173; 345/184

(58) Field of Classification Search ........... 379/88; 745/727, 728; 709/217, 219; 345/156, 169, 345/173, 184
See application file for complete search history.

(56) References Cited

U.S. PATENT DOCUMENTS

| | | | |
|---|---|---|---|
| 5,786,819 A * | 7/1998 | Weiser et al. | 715/840 |
| 5,844,392 A * | 12/1998 | Peurach et al. | 318/568.17 |
| 6,046,726 A * | 4/2000 | Keyson | 345/156 |
| 6,078,308 A * | 6/2000 | Rosenberg et al. | 715/856 |
| 6,125,385 A * | 9/2000 | Wies et al. | 709/203 |
| 6,154,201 A * | 11/2000 | Levin et al. | 345/184 |
| 6,161,126 A * | 12/2000 | Wies et al. | 709/203 |
| 6,300,938 B1 * | 10/2001 | Culver | 345/156 |
| 6,300,967 B1 * | 10/2001 | Wagner et al. | 715/784 |
| 6,317,116 B1 * | 11/2001 | Rosenberg et al. | 715/701 |
| 6,353,850 B1 * | 3/2002 | Wies et al. | 709/203 |
| 6,366,650 B1 * | 4/2002 | Rhie et al. | 379/88.13 |
| 6,429,846 B1 * | 8/2002 | Rosenberg et al. | 345/156 |
| 6,489,951 B1 * | 12/2002 | Wong et al. | 345/173 |
| 6,502,032 B1 * | 12/2002 | Newman | 701/213 |
| 6,590,303 B1 * | 7/2003 | Austin et al. | 307/119 |
| 6,686,911 B1 * | 2/2004 | Levin et al. | 345/184 |
| 6,834,373 B1 * | 12/2004 | Dieberger | 715/501.1 |
| 2002/0007379 A1 * | 1/2002 | Wang et al. | 707/515 |
| 2004/0076086 A1 * | 4/2004 | Keller et al. | 369/30.07 |

* cited by examiner

*Primary Examiner*—Saleh Najjar
*Assistant Examiner*—Shawki Ismail
(74) *Attorney, Agent, or Firm*—Van Pelt, Yi & James LLP

(57) ABSTRACT

The invention facilitates browsing of an indexed collection of electronic content by displaying information identifying a current location within the collection of electronic content using a non-visual display (e.g., audio display and/or haptic display). The information identifying the current location can be displayed with variable resolution and the content of the display of the information identifying the current location can be dependent on the resolution. The invention can be used to browse any type of electronic content, including, for example, audio content, visual content, text content or some combination of such content. The invention can be used to browse electronic content that is indexed in any way, such as, for example, electronic content that is indexed (partly or entirely) alphabetically, numerically or by date.

16 Claims, 3 Drawing Sheets

INTERFACE INCLUDING NON-VISUAL DISPLAY FOR USE IN BROWSING AN INDEXED COLLECTION OF ELECTRONIC CONTENT

CROSS-REFERENCE TO RELATED APPLICATIONS

This application is a continuation-in-part of U.S. patent application Ser. No. 09/740,580 filed on Dec. 18, 2000, now abandoned which claims benefit of U.S. provisional patent application Ser. No. 60/172,867 filed on Dec. 20, 1999, the disclosures of which are hereby incorporated by referenced herein.

BACKGROUND OF THE INVENTION

1. Field of the Invention

This invention relates to browsing an indexed collection of electronic content. In particular, the invention relates to the display to a user of information identifying a current location within the collection of electronic content as the user browses through the collection of electronic content, and, even more particularly, to the non-visual display of such identifying information.

2. Related Art

The increasing presence of devices for displaying and/or storing electronic content has resulted in an increase in collections of electronic content and the size of collections of electronic content for display and/or storage by those devices. A collection of electronic content can include audio electronic content (e.g., MP3 recordings, voicemail, computer-generated audio files in formats such as .wav or .aiff, audio books), visual electronic content (e.g., digital photographs, .gif files, jpeg files), audiovisual electronic content (e.g., DVD recordings), and/or text electronic content (phone or address lists, electronic mail, Web pages, favorites lists).

Browsing a large collection of electronic content can be tedious or difficult. Current approaches to facilitating browsing of a collection of electronic content use a visual interface. The use of a visual interface for browsing a collection of electronic content can be desirable for some applications. For example, a visual interface can be useful when used with devices that are stationary and/or large, or when the user can devote a large amount of attention to use of the interface, as is often the case in home and office applications, in which the interface is frequently used in conjunction with a television or personal computer. However, the characteristics of a visual interface can make the use of a visual interface for browsing a collection of electronic content undesirable for some applications. For example, a visual interface can require an undesirably large amount of attention (e.g., more attention than can safely be expended if the user is walking or driving, or more attention than a user engaged in another activity may want to expend), consume an undesirably large amount of power (e.g., require an undesirably large power supply), and/or be difficult to view and/or use if implemented in small display apparatus. A visual interface demands the visual attention of the user. If the user is using a visual interface to browse electronic content, the visual interface can compete with the user's understanding, enjoyment or comprehension of the electronic content. The use of a portable electronic device is an example of an application for which the use of a visual interface to enable browsing of a collection of electronic content can be undesirable, since such a device is typically small (which may make the use of a sufficiently large display apparatus and/or power supply impossible or impractical) and is often intended for use in situations in which, or in a manner such that, the user's attention may or must be focused other than on the portable electronic device (e.g., a hand-held cell phone is often used in such situations).

A previous interface for use with a cell phone has been used to browse an electronic telephone list that is sorted alphabetically by the name of a person or entity associated with each phone number in the list. A slider control is used to scroll through the list. A visual interface displays information identifying a location in the list during scrolling. The granularity of the visual display is controlled in accordance with the amount of pressure applied to the slider control during scrolling. Lightly pressing the slider control causes the full name associated with each phone number to be displayed during scrolling, while pressing the slider control harder causes only the initial letter(s) of each name to be displayed during scrolling. This interface suffers from the limitations of a visual interface discussed above.

Some MP3 players (e.g., Diamond RIO) use large dials to enable selection of audio tracks discretely. However, there is no display of high-level track identifying information to facilitate browsing and the rate of advance through the tracks is at a fixed rate, tied to the resolution of the encoder wheel, potentiometer and/or mechanical stops of the player.

Some home audio equipment and cell phones have included an encoder wheel that is used as an adjunct to a visual display, enabling a user to scroll through a list of audio tracks, names or menu items, or to adjust volume. A haptic interface provides haptic feedback during scrolling. However, the haptic feedback is provide at fixed intervals unrelated to the collection of electronic content being scrolled through, so that the haptic feedback does not facilitate browsing of the content based on an identification of individual records within the collection of electronic content. The rate of scrolling or adjustment cannot be varied.

Previously, hand-held dials or other user input interface mechanisms have been used to fast-forward through a collection of electronic content. However, since these mechanisms are not used to display index terms, but, rather, all of the electronic content (albeit at a rapid rate), the utility of such mechanisms in browsing a collection of electronic content is limited and, in any event, inferior to an interface which displays index terms during browsing.

SUMMARY OF THE INVENTION

The invention facilitates browsing of an indexed collection of electronic content by displaying information identifying a current location within the collection of electronic content using a non-visual display (e.g., audio display and/or haptic display). Such a browsing aid can be particularly useful for applications in which a visual display of the current location identifying information is disadvantageous, impractical or impossible, such as applications in which a user must (or should) browse the collection of electronic content without viewing a visual display, applications in which display device(s) must (or should) be sufficiently small that use of a visual display is impractical or impossible, and applications in which display device(s) must (or should) consume relatively little power.

According to one embodiment of the invention, browsing of an indexed collection of electronic content is facilitated by determining a current location within the indexed collection of electronic content while browsing the indexed collection of electronic content, and displaying information identifying the current location with a non-visual display device. The non-visual display device can include, for example, an audio display device, a haptic display device, or both an audio display device and a haptic display device. The information identifying the current location can be displayed with variable resolution. In that case, the content of the display of the information identifying the current location can be (and typically is) dependent on the resolution. The display of the information identifying the current location and/or control of the resolution of the display of the information identifying the current location can be enabled using the same or different apparatus. Further, either or both of the location display and resolution control can be enabled using the same apparatus as that used to browse the collection of electronic content.

The invention can be used to browse any type of electronic content, including, for example, audio content, visual content, text content or some combination of such content. The invention can be used to browse electronic content that is indexed in any way, such as, for example, electronic content that is indexed (partly or entirely) alphabetically, numerically or by date.

DETAILED DESCRIPTION OF THE INVENTION

According to the invention, a current location within an indexed collection of electronic content is displayed to a user as the user browses the collection of electronic content. In particular, the display of the current location includes a non-visual display (e.g., an audio display and/or a haptic display).

Herein, "electronic content" refers to a representation of content that is not directly perceivable by a human, such as data represented by electrical or optical signals (including digital and/or analog signals). For example, electronic content can be content that is represented by data stored in or on an electronic or optical data storage medium or media (which can be volatile or non-volatile), a large variety of which are known to those skilled in the art. For instance, electronic content can be content that is represented by data stored in hard drive or other non-volatile data storage medium of a computational device (e.g., desktop computer, laptop computer, personal digital assistant), a portable communication device phone (e.g., cell phone, pager), or an audiovisual recording or display device (e.g., a camcorder, a portable audio display device such as an MP3 player, a stereo system or stereo system component such as a compact disk player, an audiovisual display device such as a television, DVD player or VCR).

The invention can be used to facilitate browsing of electronic content of any type. It is anticipated that the invention will be particularly useful in, and typically used for, facilitating browsing of audio content, visual content, text content, or some combination of such content. For example, the invention can be used to facilitate browsing of electronic content such as visual images (e.g., digital photographs, .gif files, jpeg files), audio recordings (e.g., MP3 recordings, audio books, computer-generated audio files in formats such as .wav or .aiff), audiovisual recordings (e.g., DVD recordings), electronic mail, voice mail, or text compilations such as address books or phone lists. The invention can also be used to facilitate browsing of the World Wide Web (e.g., to facilitate use of a favorites list or selection of a Web page from a list of Web pages). While, as indicated above, it is anticipated that the invention will typically be used to facilitate browsing of audio content, visual content and/or text content, the invention can also be used to facilitate browsing of content perceived by the other senses: touch, smell and taste. For example, the invention can be used to facilitate browsing of an olfactory display of a set of fragrances.

Figure 1:
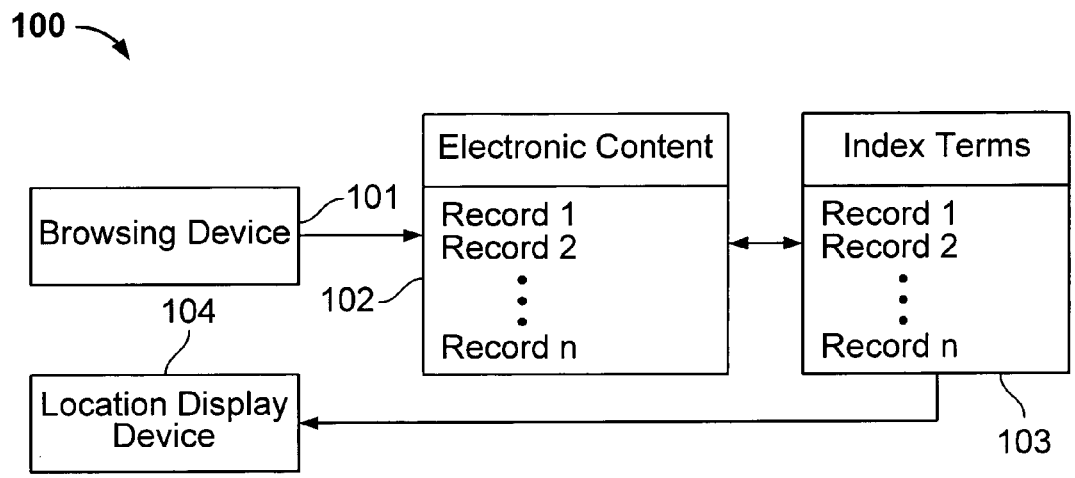
FIG. 1 is a block diagram illustrating a system for browsing an indexed collection of electronic content, the system including an interface in accordance with the invention that is adapted to provide, during browsing, a non-visual display of a current location within the collection of electronic content.

FIG. 1 is a block diagram illustrating a system 100 for browsing an indexed collection of electronic content, the system including an interface in accordance with the invention. The communication shown in FIG. 1 between components of the system 100 (as well as that shown between components of the systems 200, 310, 320, 330 and 400, described below in FIGS. 2, 3A, 3B, 3C and 4, respectively), including the directionality of that communication, is merely illustrative; it is to be understood that the invention contemplates any communication among the components of the system 100 (or system 200, 310, 320, 330 or 400), as can readily be understood by those skilled in the art, that achieves the functionality of the system 100 (or system 200, 310, 320, 330 or 400) as described herein.

In the system 100, a browsing device 101 is used to browse an indexed collection of electronic content 102. The collection of electronic content 102 includes multiple sets of content: "n" such sets, as illustrated in FIG. 1. (For convenience in presenting the description of the invention below, each set of content within a collection of electronic content—e.g., each audio track within a collection of audio tracks, each address, name or phone number within an electronic address book or phone book—is sometimes referred to herein as a "record.") A collection of index terms 103 includes, for each record of the collection of electronic content 102, an index term associated therewith. As the browsing device 101 is used to browse the collection of electronic content 102 (typically such browsing entails moving through the records of the collection of electronic content in the order specified by the indexing), the index terms associated with the records that are traversed during the browsing are communicated to a location display device 104, which uses the index terms to produce a corresponding display of a current location within the collection of electronic content 102.

Figure 2:
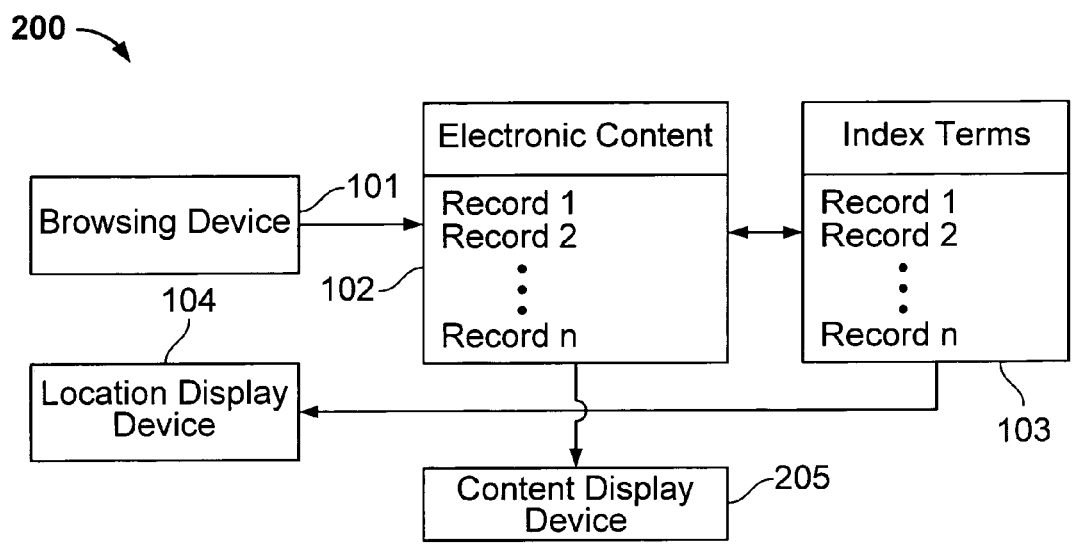
FIG. 2 is a block diagram illustrating a system as in FIG. 1 that further includes a content display device for displaying selected electronic content.

It is anticipated that, typically, the invention will be implemented as part of a system which enables one or more records to be selected from the collection of electronic content for display by a content display device (examples of such implementations are described elsewhere herein, e.g., selection of a musical recording from a large collection of musical recordings to enable display of the musical recording by an audio display device). FIG. 2 is a block diagram illustrating a system 200 for browsing an indexed collection of electronic content, the system 200 including, in addition to the components of the system 100 illustrated in FIG. 1, a content display device 205 for displaying selected electronic content. The invention can also be implemented as part of a system that enables the selection of one or more records for another purpose (e.g., storage on a data storage device) instead of, or in addition to, the display of record(s) on a content display device. For example, the invention can be used to browse a collection of electronic content and store selected records as part of a video or audio editing system.

The invention can be used generally with electronic content that is indexed in any way. The invention can be used, for instance, to facilitate browsing of a collection of electronic content that has been indexed alphabetically. For example, the invention can be used to facilitate browsing of a set of visual, audio or audiovisual recordings (e.g., movies or songs) that are alphabetically indexed by title or by the names of performers, producers, directors, etc. The invention can also be used, for instance, to facilitate browsing of a collection of electronic content that has been indexed numerically or by date. For example, the invention can be used to facilitate browsing of a schedule, a calendar or electronic mail (which is often identified by date). Both the collection of electronic content and indexing information (i.e., index terms together with an identification of the associated record from the collection of electronic content) can be stored on any of a variety of conventional data storage devices.

In a system in accordance with the invention for browsing an indexed collection of electronic content, any appropriate apparatus can be used to implement the browsing device. In general, the browsing device can be implemented using movable apparatus or non-movable apparatus. When implemented using movable apparatus, the browsing device can be implemented using rotationally movable apparatus (such as a knob) or translationally movable apparatus (such as a slider bar). When implemented using non-movable apparatus, the browsing device can be implemented by, for example, touch-sensitive apparatus (which, when implemented using apparatus such as pressure pads or force sensitive resistors, may be responsive to small-scale movements to effect control that are, nevertheless, negligible in magnitude relative to the large-scale movements used to effect control with a knob or slider bar).

In a system in accordance with the invention for browsing an indexed collection of electronic content, the current location within the collection of electronic content is determined on an ongoing basis during browsing of the collection of electronic content. This can be done in any conventional manner. The location within the collection of electronic content at a particular time is identified based on the index term(s) associated with a record of the collection of electronic content that is being accessed at that time (indexing information stored with the electronic content is used to identify the appropriate index term(s)). The record of a collection of electronic content that is being accessed at a particular time can be determined, as known to those skilled in the art, in a conventional manner. For example, the record being accessed can be determined in accordance with characteristic(s) and/or operation of the browsing device and/or a data storage device or devices in which the collection of electronic content is stored. For instance, when the browsing device is a rotatable knob, the record being accessed can be determined in accordance with an identification of a starting record within the collection of electronic content that corresponds to a starting position of the rotatable knob, a specified order of the records as stored in a data storage device, the amount of rotation of the knob, and the predetermined amount of rotation of the knob that corresponds to traversal from one record to the next.

Figure 3A:
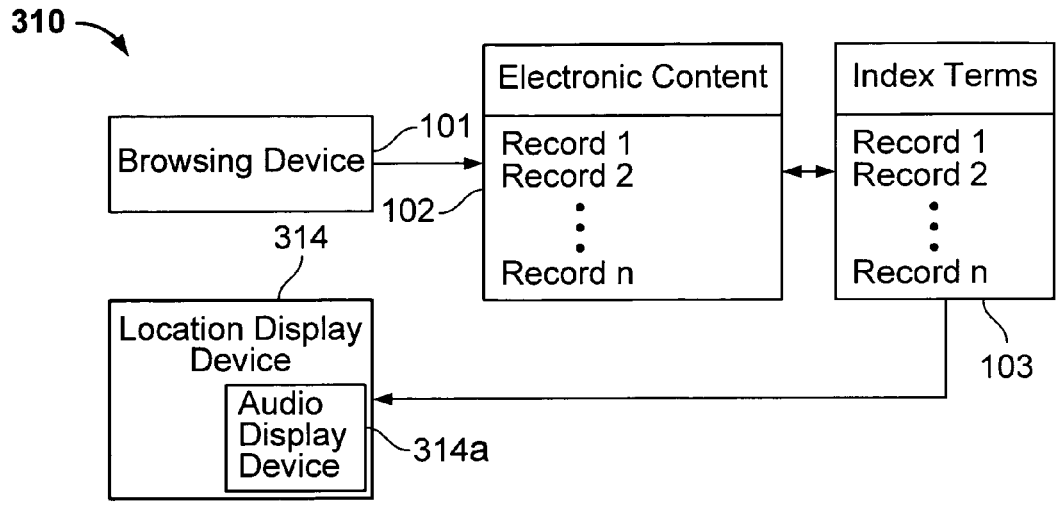
FIG. 3A is a block diagram of a system as in FIG. 1 in which the non-visual display includes an audio display.
Figure 3B:
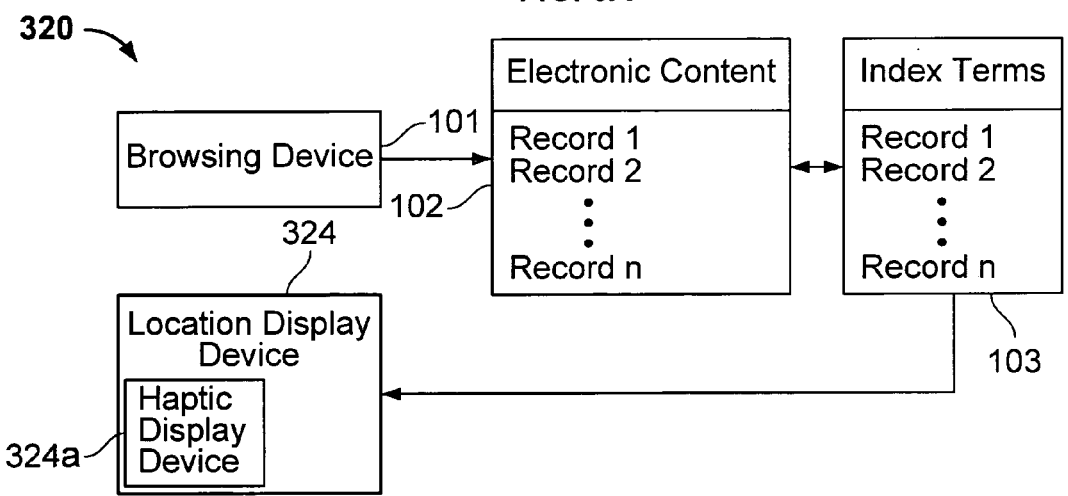
FIG. 3B is a block diagram of a system as in FIG. 1 in which the non-visual display includes a haptic display.
Figure 3C:
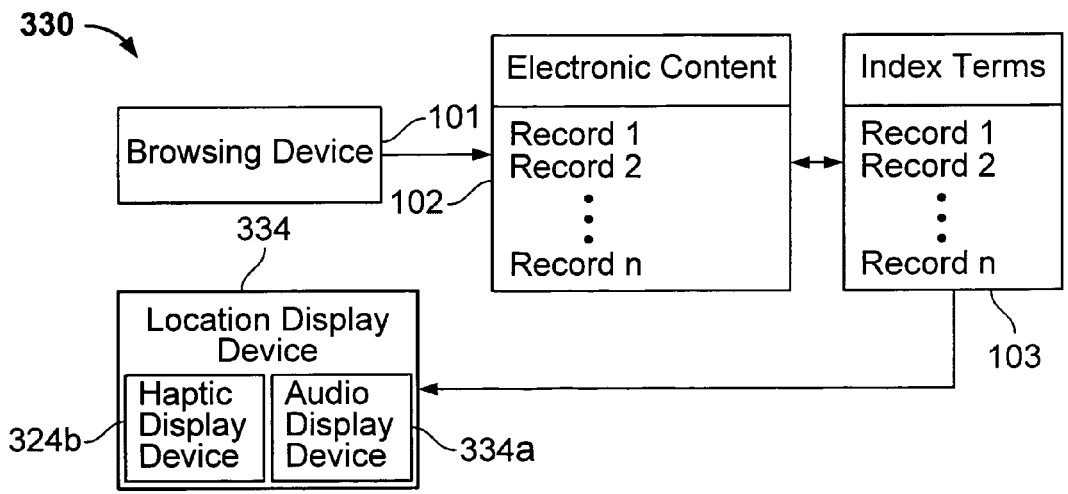
FIG. 3C is a block diagram of a system as in FIG. 1 in which the non-visual display includes an audio display and a haptic display.

In a system in accordance with the invention for browsing an indexed collection of electronic content, any appropriate apparatus can be used to implement the location display device. In particular, according to the invention, the location display device includes a non-visual display device for displaying the current location within the collection of electronic content. For example, audio display of the current location can be implemented using conventional audio display apparatus (e.g., speakers, headphones, audio jacks). FIG. 3A is a block diagram illustrating a system 310 for browsing an indexed collection of electronic content, the system 310 including an interface in accordance with the invention in which a location display device 314 includes an audio display device 314a. Haptic display of the current location can also be implemented by any type of haptic display apparatus to provide an appropriate tactile or kinesthetic sensation. FIG. 3B is a block diagram illustrating a system 320 for browsing an indexed collection of electronic content, the system 320 including an interface in accordance with the invention in which a location display device 324 includes a haptic display device 324a. For instance, haptic display of the current location can be implemented using active or passive force feed back devices (e.g., actuators, brakes, devices that respond to audio vibrations or magnetic fields). Haptic display devices that can be used with the invention are described in more detail in commonly owned, co-pending U.S. patent application Ser. No. 09/433,607, entitled "Flexible Variation of Haptic Interface Resolution," by Scott S. Snibbe et al., filed on Nov. 2, 1999, the disclosure of which is incorporated by reference herein. An interface in accordance with the invention can also include both an audio display and a haptic display of the current location. FIG. 3C is a block diagram illustrating a system 330 for browsing an indexed collection of electronic content, the system 330 including an interface in accordance with the invention in which a location display device 334 includes both an audio display device 334a and a haptic display device 334b.

The location display device can be implemented in the same apparatus as the browsing device, or the two can be implemented in different apparatus. As an example of the former, a cell phone can be constructed so that the cell phone can be used to browse a list of phone numbers (e.g., using a keypad of the cell phone) and to display an identification of a current phone number in the list using non-visual display apparatus (e.g., by causing an audio speaker of the cell phone to produce an audio display of the first letter of the index term associated with the current phone number in the list). As an example of the latter, a computer mouse can be used to browse Web pages on the World Wide Web (providing the functionality of the browsing device), while one or more audio speakers provide an audio display based on the index term associated with a Web page that is currently being accessed (providing the functionality of the location display device). Those skilled in the art can readily appreciate that, for any particular application of the invention, there can be many ways of implementing the browsing device and location display device, some in which the browsing device and location display device are implemented in the same apparatus and others in which they are not.

In general, in a system in accordance with the invention for browsing an indexed collection of electronic content, the display of the current location within the collection of electronic content 102 is updated on an ongoing basis. The display of the current location can be updated at any interval, including continuously (or nearly continuously). The update interval of the current location display can be measured in any manner, e.g., the current location display can be updated after passage of a period of time of specified duration, the current location display can be updated after traversal of a specified number of records in the collection of electronic content, the current location display can be updated after a specified amount of movement of some part or all of a movable browsing device, the current location display can be updated after application of a specified increment of pressure to a touch-sensitive browsing device. The invention can be implemented so that if there is no change—given the resolution of the display, as discussed below—in the current location since the last display of the current location, the current location is not displayed again. Alternatively, the invention can be implemented so that the current location is displayed even if there has been no change in the current location since the last display of the current location, i.e., the same current location is displayed again.

The invention can be implemented so that the resolution of the current location display can vary. The "resolution" of the current location display refers to the granularity with which the current location within a collection of electronic content is displayed. For example, when browsing a collection of electronic content indexed alphabetically, a relatively coarse location display resolution can cause the current location to be displayed as some multiple of the nth letter of the alphabet (e.g., every second letter), based on the first letter of each of the index terms (e.g., when the current location is at a record having an index term beginning with "A" or "B," the current location is displayed as "A;" when the current location is at a record having an index term beginning with "C" or "D," the current location is displayed as "D;" etc.). A finer location display resolution can cause the current location to be displayed as the letter of the alphabet which is the first letter of the index term associated with the record at the current location. A still finer location display resolution (based on the location display resolution described in the previous sentence) can cause the current location to be displayed as the first two letters of the index term associated with the record at the current location (e.g., the current location within a collection of electronic content including records arranged in alphabetical order is displayed successively, depending on the exact letters used in the index terms of successive records, as "AA," "AB," "AC," etc.). Another finer location display resolution can cause the current location to be displayed as a unique identification (e.g., the full index term) of the record at the current location.

When the invention is implemented to enable variation in the resolution of the display of the current location within the collection of electronic content, the content of the current location display can depend upon the resolution, and it is anticipated that this will typically be the case. For example, if a collection of electronic content is indexed alphabetically, the content of the current location display will typically depend on the resolution, e.g., for a resolution that causes the current location to be displayed as the letter of the alphabet which is the first letter of the index term associated with the record at the current location (or as some multiple of the nth letter of the alphabet which is closest to the first letter of the index term associated with the record at the current location), the appropriate letter can be displayed (e.g., spoken), while for a resolution that causes the current location to be displayed as a unique identification of the record at the current location, some or all of the index term associated with that record (e.g., the title of a song or book, or the name of a musician or author) can be displayed (e.g., spoken).

In some embodiments of the invention, the resolution of the current location display can advantageously be mapped to a hierarchical relationship among records of the collection of electronic content. For example, each record of a collection of electronic content may be a musical track from a particular album (or other compilation) by a particular artist. The collection of electronic content can be arranged hierarchically, with the musical tracks grouped into albums and the albums grouped together by artist. A relatively coarse location display resolution can cause display of an identification (e.g., name) of the artist associated with the musical track at the current location in the collection of electronic content, an intermediate location display resolution can cause display of an identification (e.g., title) of the album (or other compilation) of which the musical track is part, and a relatively fine location display resolution can cause display of an identification (e.g., title) of the particular musical track.

The invention can be implemented so that changes in resolution of the current location display can be effected automatically and/or as a result of user input intended by the user to effect control of the resolution of the current location display. Control of the current location display resolution can be implemented in any appropriate manner. As will be appreciated by those skilled in the art, methods and apparatus for varying the resolution of the current location display can be used that are analogous to those described in the above-mentioned commonly owned, co-pending U.S. patent application Ser. No. 09/433,607 for varying the resolution of a haptic display.

The invention can be implemented so that the current location display resolution can be varied using the same apparatus as that used to implement the browsing device. For example, a movable browsing device can be implemented so that the resolution of the current location display varies with the speed with which the movable browsing device is moved (e.g., the resolution decreases as the speed of movement of the browsing device increases and vice versa). Or, for example, a movable browsing device can be implemented to sense the application of force in a direction orthogonal to the direction of movement used to effect browsing control, the resolution of the current location display varying in accordance with the magnitude of the applied force (e.g., the resolution decreases as the magnitude of the applied force decreases and vice versa). Or, for example, a movable browsing device can be implemented with multiple moving parts (e.g., a set of concentric dials) that each correspond to a different resolution of the current location display. Or, for example, a touch-sensitive browsing device can be implemented so that the resolution of the current location display varies with the pressure applied to a part of the touch-sensitive browsing device.

The invention can also be implemented so that the current location display resolution can be varied using an apparatus different from that used to implement the browsing device. For example, one or more pushbuttons separate from the browsing device can be used to select a resolution of the current location display. Or, for example, a set of concentric dials separate from the browsing device can be used to select a resolution of the current location display, each dial corresponding to a predetermined resolution.

The invention can also be implemented so that the location display device and the resolution control device, or all three of the location display device, resolution control device and browsing device, are implemented in the same apparatus. For example, all three can be implemented in a cell phone, a keypad of the cell phone being used to effect browsing and locating display resolution control and an audio speaker being used to produce the current location display.

Figure 4:
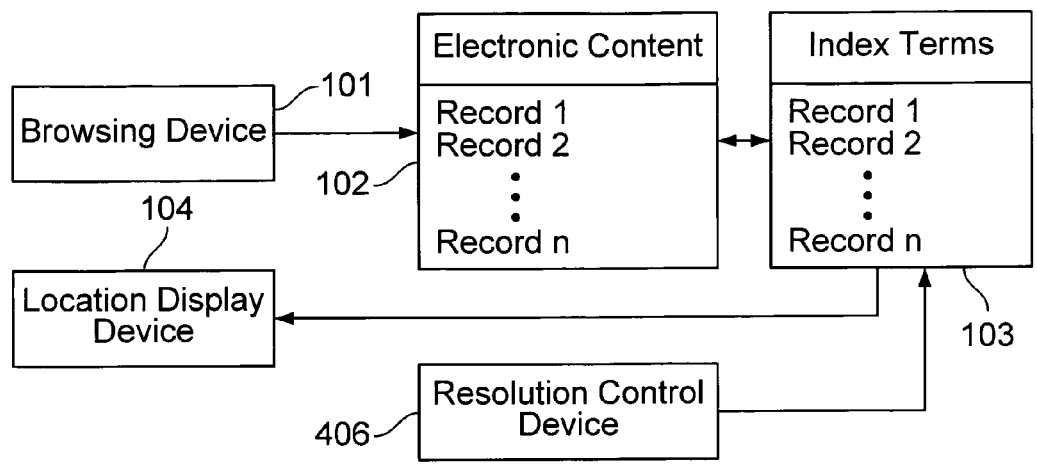
FIG. 4 is a block diagram illustrating a system as in FIG. 1 that further includes a resolution control device for controlling the resolution with which the current location is displayed.

Whether implemented separately from, or integrally with, the browsing device and/or location display device, apparatus used to effect control of the resolution of the current location display is referred to herein as a "resolution control device." FIG. 4 is a block diagram of a system 400 for browsing an indexed collection of electronic content, the system 400 including, in addition to the components of the system 100 illustrated in FIG. 1, a resolution control device 406 for controlling the resolution with which the current location is displayed.

Below, a particular embodiment of the invention is described in detail to illustrate how the invention can be implemented, and to facilitate and enhance understanding of the invention. However, it is to be understood that the invention encompasses implementation using a wide variety of other apparatus and, consistent with the principles of the invention, having a variety of other functionality.

In one embodiment of an interface in accordance with the invention, a rotatable control knob operating in conjunction with audio and haptic feedback (display) is used to browse a large collection of electronic content. Rotation of the knob is related to an index to the records of the collection of electronic content: a specified amount of rotation of the knob corresponds to traversal of a specified number of records within the collection of electronic content. The index terms of the index are arranged in alphabetical order. The rotatable knob and the audio feedback can be implemented so that when the knob is turned rapidly, an audio display is produced in which only letters are heard (i.e., "A," "B," "C," etc.), a letter being heard only once when the first record having an index term beginning with that letter is traversed. The rotatable knob and the audio feedback can also be implemented so that when the knob is turned slowly (such as may be desirable when, during browsing, the letter with which the index term for a desired record begins is reached), an audio display is produced in which complete index terms associated with records are heard. (What constitutes "rapidly" and "slowly" turning the rotatable knob can be established as desired and may be affected by, for example, the particular apparatus used to implement the interface and the application for which the interface is used.) Haptic feedback can accompany the audio display. For example, the rotatable knob can be implemented, using apparatus and methods known to those skilled in the art, to simulate a series of detents as the knob is rotated, enhancing the audio feedback. Further, the intensity of the detents can be varied with the resolution of the audio display, e.g., strong detents can be simulated to coincide with the display of each letter of the alphabet during fast rotation of the knob, and gentler detents can be simulated to coincide with the display of each complete index term during slow rotation of the knob.

The above-described embodiment of an interface in accordance with the invention can be implemented using a circular knob operably connected to an actuator and an encoder. This apparatus communicates with a computational device (e.g., microprocessor and, as necessary or desirable, associated devices) that is operated in accordance with appropriate control software for enabling and effecting the functions of the interface, as well as voice synthesis software (which can be embodied by any of a variety of commercially available such software) for controlling audio speaker(s) for producing the audio display. The control software has access to stored indexing information for the collection of electronic content (e.g., a list of artists' names and/or song titles that describe a repository of audio files).

Figure 5:
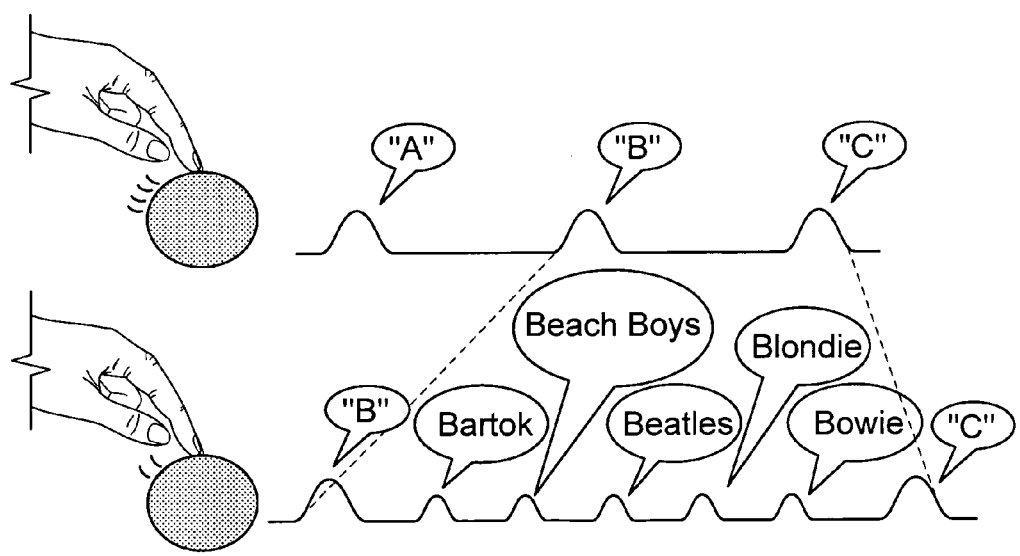
FIG. 5 is an illustration of a virtual representation of one embodiment of an interface in accordance with the invention, illustrating operation of the functional components of the interface.

When the control software detects rotation of the knob, the control software accesses the index terms (e.g., list of artists' names and/or song titles) in accordance with a starting location in the set of index terms and the amount of rotation of the knob. The control software also determines the speed of rotation of the knob and evaluates whether the speed is above a first specified threshold value or below a second specified threshold value (the first and second threshold values can be equal). When the rotational speed of the knob is determined to be above the first specified threshold value, the first character of an index term being accessed is identified. If this character is different from the last identified first character of an index term (if any), the control software transmits this character to the voice synthesizer for production of the appropriate audio display and triggers a sharp haptic click (detent) through the actuator. The audio display and click are heard/felt simultaneously. When the rotational speed of the knob is determined to be below the second specified threshold value, the entire index term (e.g., artist name or song title) being accessed is identified and, if different from the last identified index term (if any), the control software transmits this index term to the voice synthesizer for production of the appropriate audio display and triggers a light haptic click (detent) through the actuator. The audio display can be implemented so that the display rate of the speech produced by the voice synthesizer can vary in accordance with the speed of rotation of the knob (e.g., the slower the rotational speed of the knob, the slower the display rate of the speech). When a desired index term is found (e.g., artist name or song title), rotation of the knob can be stopped and the corresponding record (e.g., audio track) can displayed by an appropriate display device, either automatically or as a result of input by the user. FIG. 5 is an illustration of a virtual representation of the embodiment of an interface in accordance with the invention described above, illustrating operation of the interface to browse a set of musical recordings.

The above-described embodiment of the invention can be modified to provide other resolutions of the current location display by identifying the rotational speed of the knob with greater specificity than that described above. For example, when the knob is being turned very quickly (i.e., at a speed greater than a third threshold value that is itself greater than the first threshold value discussed above), the audio display can skip letters of the alphabet in accordance with the rotational speed of the knob (e.g., the greater the rotational speed, the more letters that are skipped at a time). Additionally, when the knob is being turned at a moderate speed (i.e., at a speed that is less than the first threshold value discussed above, but greater than a fourth threshold value that is smaller than that first threshold value), part of an index term can be displayed, e.g., part of an artist's name (for example, in FIG. 5, "bar," "bea," "blon") or part of a song title.

The invention can be used for a wide variety of applications. For example, the invention can be advantageously used to implement an alphabet browser for an MP3 (or other) audio player, which can be used, for example, to play audio tracks from a large collection which may include hundreds of tracks from different individual artists (the names of the artists, arranged in alphabetical order, can be used to provide an index to the audio tracks). The invention can also be advantageously used, for example, with portable devices, such as cell phones, to facilitate browsing of an electronic telephone directory or address book by enabling fast identification and retrieval of phone numbers or addresses. The invention can also be advantageously used, for example, as part of a user control interface of a vehicle audio system to facilitate fast and safe selection of audio tracks within a vehicle (e.g., automobile, truck, bus, plane, etc.) environment and, in particular, while the user is operating the vehicle. The invention can also be advantageously used, for example, to facilitate browsing of Web pages or use of other computer applications by a blind or physically handicapped user.

Browsing a collection of electronic content including a large number of records is facilitated (e.g., simplified, sped up) if the records are organized in a sequence and if landmarks are provided during the browsing, as is done in accordance with the present invention. For example, when a collection of electronic content can be organized alphabetically, the use of the invention to produce an audio display of the letters of the alphabet as a user browses through the collection of electronic content provides easily recognizable audio landmarks that constrain the search for a particular record within the collection of electronic content so that the user can more easily locate the record. Additionally, such audio landmarks enable the search to be performed more quickly, since the user can quickly assimilate the alphabetic sequence during browsing.

Further, the use of an interface according to the invention to facilitate browsing of a collection of electronic content can be preferable to the use of a visual interface, particularly for certain applications. For example, when a portable device is used for browsing a collection of electronic content, safety and simplicity of interaction are often important (e.g., when the portable device is used while driving, walking or running). For low-attention home browsing applications (e.g., use of a portable device while engaged in household chores or other household activity that engages a portion of a user's attention), an interface requiring relatively little attention is desirable. An interface according to the invention can advantageously be used for such applications, since an interface according to the invention demands less of a user's attention to monitor the current location within the collection of electronic content while browsing than does a visual interface used for that purpose, thus enabling the user to devote more attention to observation of the electronic content itself or to other task(s) in which the user is engaged during browsing. For example, in the particular embodiment and application of the invention illustrated in FIG. 5 and described in detail above, the invention can provide a way to browse through a large collection of audio content with a single knob and without need to view a visual display, with the display of the current location within the collection of audio content delivered through the same apparatus used to display the audio content (e.g., headphones or speakers). Additionally, an interface according to the invention can also minimize other undesirable characteristics of a visual interface (e.g., relatively large size and power consumption of the display apparatus), since an audio display and/or a haptic display can often be implemented in smaller and/or less power-hungry apparatus than a visual display.

Embodiments of the invention in which the display of the current location includes an audio display can be particularly advantageously used to browse collections of electronic content represented in whole or in part by audio data. This is so, for example, since the display of the current location can make use of the same display apparatus as that used to effect display of the electronic content, thus eliminating the need to provide separate display apparatus for the interface according to the invention. Thus, as can be appreciated, such embodiments of the invention can be advantageously used with devices such as MP3 (or similar) players or cell phones.

The provision of a haptic display together with an audio display in an interface according to the invention can be advantageous because the haptic display can provide a greater level of control during browsing. The provision of a haptic display together with an audio display can, for example, help reduce or prevent overshooting a desired record within the collection of electronic content while browsing. Further, the simulation of detents, as described above, can help to set up a rhythm or pace of search as the user feels the individual detents "pass by" during browsing. Additionally, the ability to increase or decrease the resolution of a haptic display of an interface according to the invention can keep the use of the interface comfortable and simple, even when browsing a collection of electronic content including hundreds or thousands of records.

Though the invention is generally described above as implemented with an audio or an audio and haptic location display, an interface according to the invention can also be implemented with a haptic display only. For example, an interface according to the invention can be implemented so that various textures produced by a haptic display of the interface map to particular subsets of a collection of electronic content (e.g., distinct musical or visual genres within a collection of audio, visual or audiovisual recordings). Or, for example, an interface according to the invention can be implemented so that varying levels of friction or viscosity produced by a haptic display of the interface map to locations within a collection of electronic content or a particular record within a collection of electronic content.

Various embodiments of the invention have been described. The descriptions are intended to be illustrative, not limitative. Thus, it will be apparent to one skilled in the art that certain modifications may be made to the invention as described herein without departing from the scope of the claims set out below.

We claim:

1. An interface for facilitating browsing of an indexed collection of electronic content, comprising:

determining a current location within an index associated with the indexed collection of electronic content while browsing the indexed collection of electronic content;

a non-visual display device for displaying information identifying the current location;

a location display resolution controlling device for controlling the resolution with which the information identifying the current location is displayed by the non-visual display device;

a non-visual resolution feedback device for providing non-visual feedback representative of a current resolution with which the information identifying the current location that is currently being displayed by the non-visual display device;

wherein the non-visual device display further comprises a haptic display device; and wherein the haptic display device further comprises identifying individual records by providing a distinct haptic feedback for each record while navigating through the records in the indexed collection of electronic content.

2. An interface as in claim 1, wherein the non-visual display device further comprises an audio display device.

3. An interface as in claim 1, wherein the content of the display of the information identifying the current location is dependent on the location display resolution.

4. An interface as in claim 1, further comprising a browsing device for controlling the current location within the indexed collection of electronic content.

5. An interface as in claim 4, wherein the location display resolution controlling device and the browsing device are embodied in the same apparatus.

6. An interface as in claim 4, wherein the non-visual display device, the location display resolution controlling device and the browsing device are embodied in the same apparatus.

7. An interface as in claim 4, wherein the location display device and the browsing device are embodied in the same apparatus.

8. An interface as in claim 1, further comprising a display device for displaying a selected record from the collection of electronic content.

9. An interface as in claim 1, wherein the electronic content comprises audio content.

10. An interface as in claim 1, wherein the electronic content comprises visual content.

11. An interface as in claim 1, wherein the electronic content comprises text content.

12. An interface as in claim 1, wherein at least some of the electronic content is indexed alphabetically.

13. An interface as in claim 1, wherein at least some of the electronic content is indexed numerically.

14. An interface as in claim 1, wherein at least some of the electronic content is indexed by date.

15. A method for facilitating browsing of an indexed collection of electronic content, comprising the steps of:

determining a current location within an index associated with the indexed collection of electronic content while browsing the indexed collection of electronic content;

displaying information identifying the current location with a non-visual display device;

controlling the resolution with which the information identifying the current location is displayed by the non-visual display device with a location display resolution controlling device;

providing non-visual feedback representative of a current resolution with which the information identifying the current location that is currently being displayed by the non-visual display device with a non-visual resolution feedback device;

wherein the non-visual device display further comprises a haptic display device; and wherein the haptic display device further comprises identifying individual records by providing a distinct haptic feedback for each record while navigating through the records in the indexed collection of electronic content.

16. A computer readable storage medium or media on which is stored one or more computer programs for providing an interface for facilitating browsing of an indexed collection of electronic content, the one or more computer programs comprising:

instruction for determining a current location within an index associated with the indexed collection of electronic content while browsing the indexed collection of electronic content;

instructions for displaying information identifying the current location with a non-visual display device;

instructions for controlling the resolution with which the information identifying the current location is displayed by the non-visual display device with a location display resolution controlling device;

instructions for providing non-visual feedback representative of a current resolution with which the information identifying the current location that is currently being displayed by the non-visual display device with a non-visual resolution feedback device;

wherein the non-visual device display further comprises a haptic display device; and wherein the haptic display device further comprises identifying individual records by providing a distinct haptic feedback for each record while navigating through the records in the indexed collection of electronic content.

* * * * *